July 29, 1924.  
A. SERAFINI  
AUTOMOBILE WHEEL CHAIN MECHANISM  
Filed Jan. 17, 1924
1,503,012
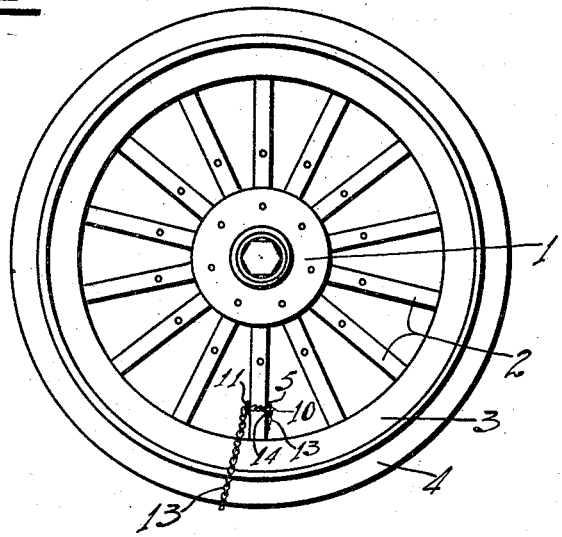
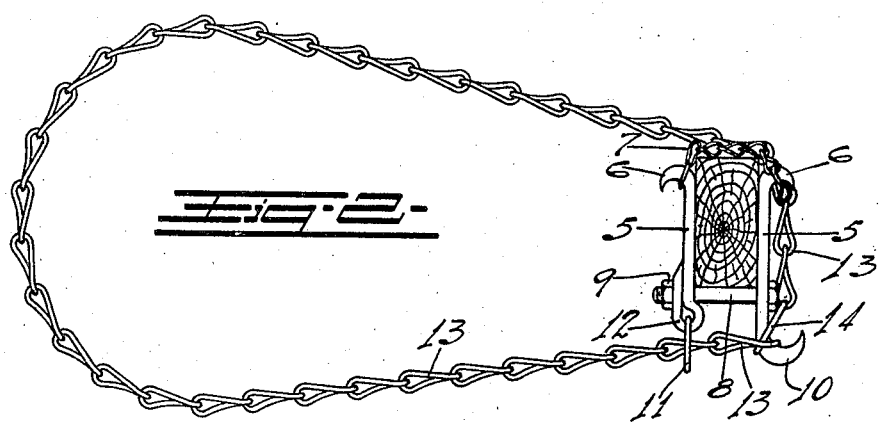
Inventor  
Angelo Serafini  
By
Attorney Patented July 29, 1924.

1,503,012

UNITED STATES PATENT OFFICE.

ANGELO SERAFINI, OF ERIE, PENNSYLVANIA.

AUTOMOBILE WHEEL CHAIN MECHANISM.

Application filed January 17, 1924. Serial No. 686,753.

*To all whom it may concern:*

Be it known that I, ANGELO SERAFINI, a subject of the King of Italy, residing at Erie, in the county of Erie and State of Pennsylvania, have invented new and useful Improvements in Automobile Wheel Chain Mechanism, of which the following is a specification.

This invention is designed to improve automobile wheel chains, particularly such chains as are secured to a spoke and encircle the tire. The invention is particularly desired to improve the spoke attaching means making the same adjustable so that it may be readily applied to different types and sizes of spokes.

The invention is illustrated in the accompanying drawings as follows:—

Fig. 1 shows a side elevation of a wheel with a chain in place.

Fig. 2 an enlarged cross section of a spoke showing the chain attaching device in place thereon and a chain loop in place on the attaching device.

1 marks the hub of the wheel, 2 the spokes, 3 the felloe of the wheel and 4 the tire.

The attaching device comprises the side plates 5—5. These plates have the hooks 6 at their inside ends and a chain 7 extends across from hook to hook securing the plates at the front and rear sides of a spoke, the links of the chain making an adjustable means of securing the plates to the spoke. The outside ends of the plates are secured by a bolt 8 having a nut 9.

When in place the plates are arranged at each side of the spoke, the bolt at one edge and the chain 7 at the opposite edge preferably toward the truck body.

One of the plates 5 is provided with a hook 10 and the other plate with a ring 11 secured to a loop 12 at the end of a plate 5. A chain 13 has an attaching link 14 arranged over the hook 10. The opposite end of the chain is carried through the ring 11 and placed over the hook 10 thus securing the link 14 and also the opposite end of the chain.

The link 14 is preferably hooked on to the hook 10 and the chain carried through the wheel between two spokes over the tire and then passed through the link 11 and hooked over the hook 10.

What I claim as new is:—

1. In an automobile wheel chain mechanism, the combination of a spoke attaching means comprising side plates adjustable relatively to each other and one having a hooked end; a chain secured to the other of the plates and hooked over the hooked end to adjustably draw the plates together and secure the same to the sides of a spoke; devices securing the opposite ends of the plates together at the opposite side of a spoke; and a chain loop secured to the plates and adapted to encircle a tire.

2. In an automobile wheel chain mechanism, the combination of a spoke attaching means comprising side plates, one of the ends of the plates having a hook; a chain secured to the similar end of the other plate and arranged on the hook, the opposite ends of the plates having a chain loop securing means comprising a hook on one plate and a ring on the other plate; and a chain having a link arranged over the hook with the opposite end of the chain extending through the ring over the hook.

3. In an automobile wheel chain mechanism, the combination of a spoke attaching means comprising side plates, one having a hooked end; a chain secured to the other of the plates and hooked over the hooked end to adjustably secure the plates; a bolt arranged at the opposite ends of the plates, the chain and bolt being adapted to be at opposite sides of an included spoke; and a chain loop secured to the plates and adapted to encircle a tire.

In testimony whereof I have hereunto set my hand.

ANGELO SERAFINI.